No. 894,010. PATENTED JULY 21, 1908.
E. F. JEWETT.
CONTROLLABLE POWER TRANSMITTING MECHANISM.
APPLICATION FILED MAR. 19, 1907.

3 SHEETS—SHEET 1.

WITNESSES
Joshua Bergston
C. W. Fairbank

INVENTOR
Eri F. Jewett
BY Munn & Co
ATTORNEYS

No. 894,010. PATENTED JULY 21, 1908.
E. F. JEWETT.
CONTROLLABLE POWER TRANSMITTING MECHANISM.
APPLICATION FILED MAR. 19, 1907.
3 SHEETS—SHEET 2.
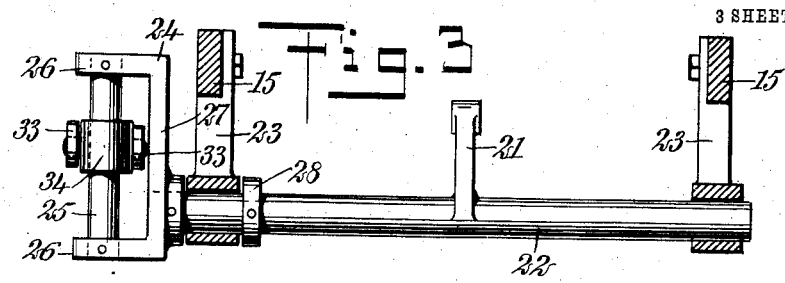
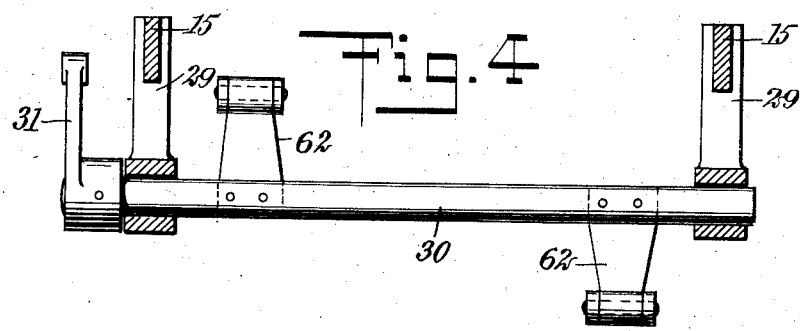
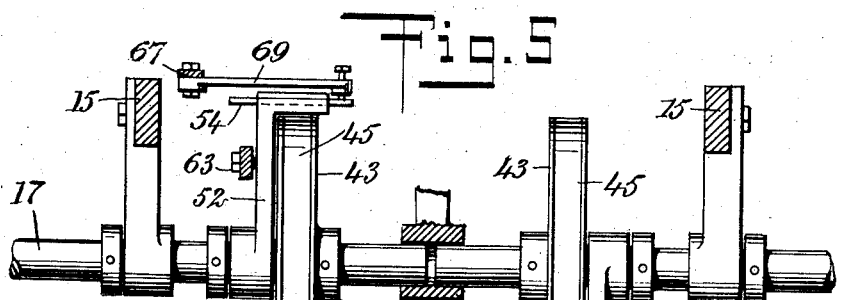
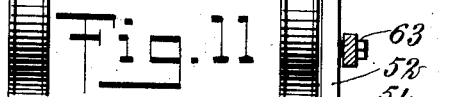
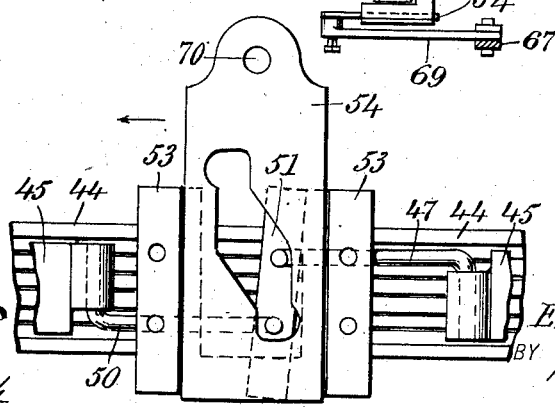
WITNESSES
INVENTOR
Eri F. Jewett
BY Munn & Co
ATTORNEYS

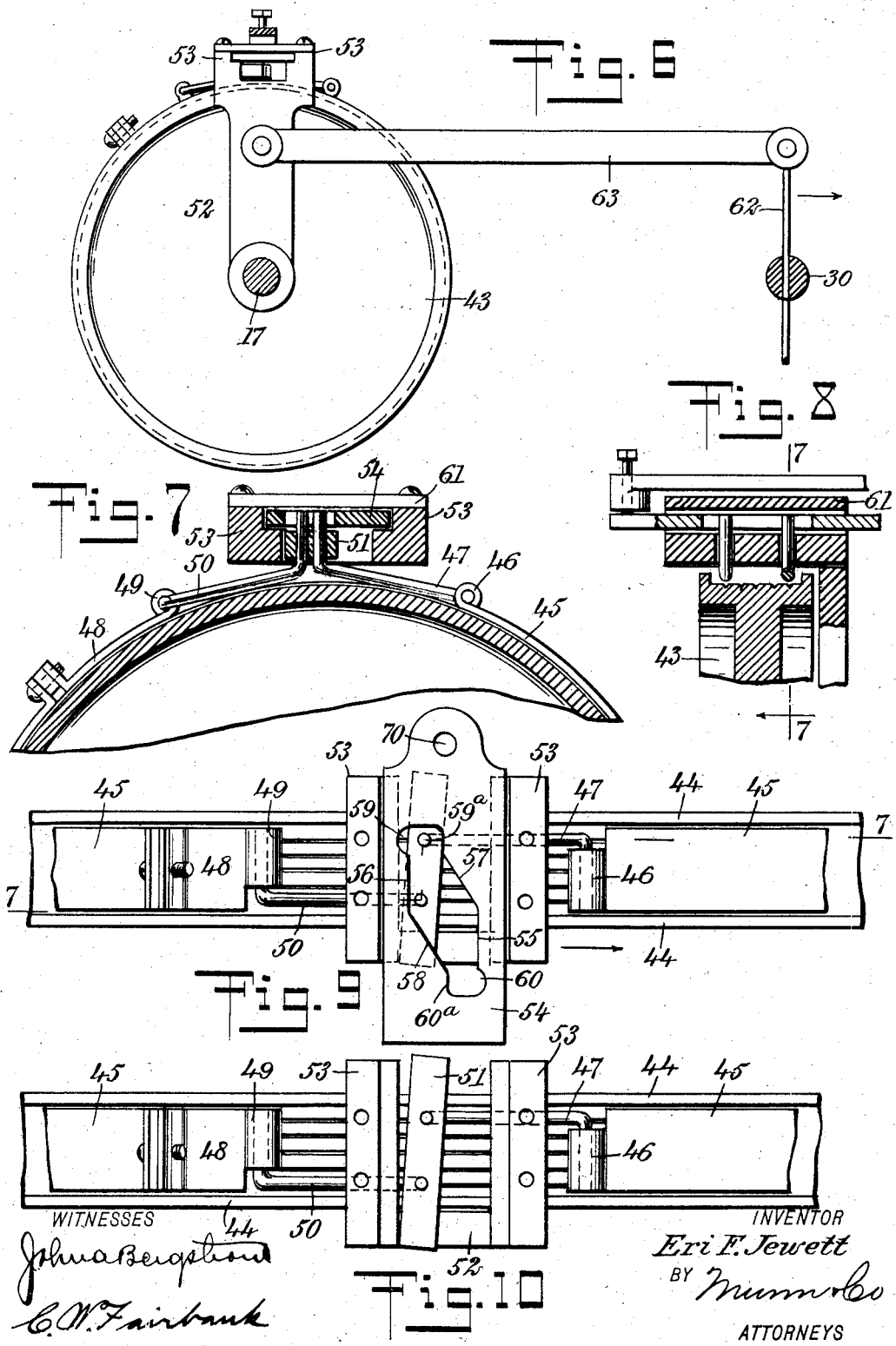

UNITED STATES PATENT OFFICE.

ERI FERRIS JEWETT, OF NEWTOWN, OHIO, ASSIGNOR TO JOHN B. JEWETT, OF NEWTOWN, OHIO.

CONTROLLABLE POWER-TRANSMITTING MECHANISM.

No. 894,010.  Specification of Letters Patent.  Patented July 21, 1908.

Application filed March 19, 1907. Serial No. 363,241.

*To all whom it may concern:*

Be it known that I, ERI FERRIS JEWETT, a citizen of the United States, and a resident of Newtown, in the county of Hamilton and State of Ohio, have invented a new and Improved Controllable Power - Transmitting Mechanism, of which the following is a full, clear, and exact description.

This invention relates to certain improvements in power transmitting mechanism, and more particularly to a combined transmission gear, reversing apparatus, brakes and clutch.

My improved mechanism is adapted for use in connection with machinery of any kind in which it is desired to transmit power from a prime mover to a drive shaft, and in which it is desired to control the speed of the shaft in respect to the speed of the engine and reverse the direction of rotation of said shaft.

To clearly disclose the construction and operation of my improved mechanism, I have illustrated it as applied to a motor vehicle and designed to transmit the power from the engine to the rear axle, whereby with the engine running at constant speed, the speed of the vehicle may be controlled at will and run either forward or backward.

The invention consists in certain features of construction and combination of parts, all of which will be fully set forth hereinafter and particularly pointed out in the claims.

Figure 1:
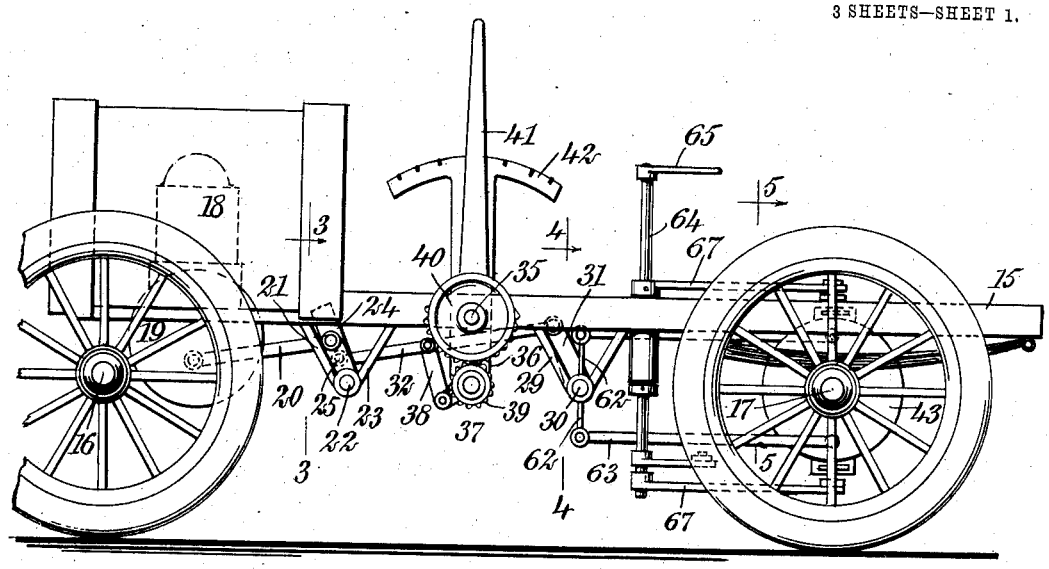
Figure 2:
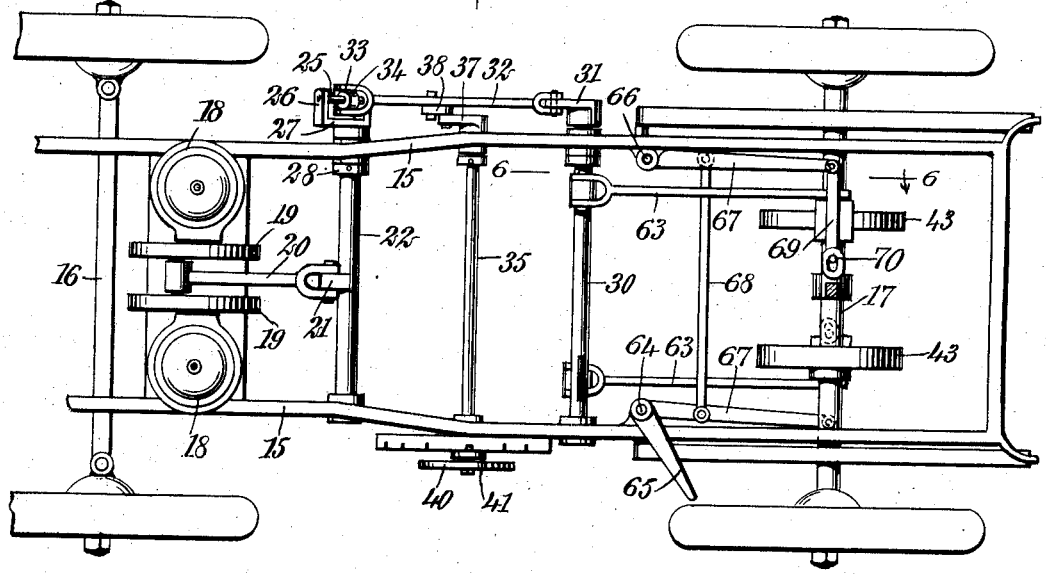

Reference is to be had to the accompanying drawings forming a part of this specification, in which similar characters of reference indicate corresponding parts in all the figures, and in which Figure 1 is a side elevation of a motor vehicle having my improved mechanism applied thereto; Fig. 2 is a plan view; Fig. 3 is a vertical transverse section on the line 3—3 of Fig. 1; Fig. 4 is a vertical transverse section on the line 4—4 of Fig. 1; Fig. 5 is a vertical transverse section on the line 5—5 of Fig. 1; Fig. 6 is a vertical longitudinal section on the line 6—6 of Fig. 2; Fig. 7 is a vertical longitudinal section through one of the reversible clutches, said section being taken on the lines 7—7 of Figs. 8 and 9; Fig. 8 is a transverse section through a portion of the reversible clutch; Fig. 9 is a plan view of the reversing mechanism of the clutch, the cover thereof being removed; Fig. 10 is a plan view similar to Fig. 9, but with the reversing plate removed; and Fig. 11 is a view similar to Fig. 9, but showing the reversing plate in its opposite position.

In Figs. 1 and 2 my device is illustrated in connection with a motor vehicle having a suitable main frame 15 supported upon front and rear axles 16 and 17 and supporting any suitable form of prime mover, as, for instance, an internal combustion engine 18. The engine is illustrated as having two cylinders and two fly wheels 19, both of which are connected to a connecting rod 20. This rod is pivotally connected at its outer end to an upwardly-extending arm 21 of a rock shaft 22 journaled in brackets 23 depending from the side members of the main frame 15. The operation of the engine serves to rotate the fly wheels 19, and as the arm 21 is of greater length than the throw of the connecting rod 20, the shaft 22 is continuously oscillated by the operation of the engine. The outer end of the rock shaft 22 carries a bracket 24 rigidly secured thereto and serving to support a rod 25 lying in the same plane with the shaft 22 and at right angles thereto. The rod is firmly supported at both ends, and the bracket 24 is of such a shape that an unobstructed portion of the rod 25 lies in alinement with the axis of the rock shaft 22. This bracket 24, as illustrated, comprises a U-shaped member having the rod 25 secured within the opposite parallel members 26 and having the base portion 27 provided with a collar keyed to the rock shaft. This collar is illustrated as engaging with one side of the bracket 23 and coöperating with a second collar 28 on said shaft for preventing the longitudinal movement thereof.

Lying substantially parallel to the rock shaft 22 and journaled within brackets 29 similar to the brackets 23, I provide a second rock shaft 30 adapted to be operated from the rock shaft 22. This rock shaft 30 carries an arm 31 rigidly secured thereto, and the outer end of said arm is pivoted to a link 32, the opposite end of which is in operative engagement with the rod 25. As illustrated, the end of the link 32 is provided with yoke arms 33 having pivotally mounted therebetween a collar 34 inclosing the rod 25 above referred to.

Intermediate the two rock shafts 22 and 30 above referred to and lying substantially parallel thereto, I provide a third shaft 35 journaled in depending brackets 36 and carrying an arm 37, the end of which is operatively connected to the link 32 intermediate the ends of the latter by means of a short pivotally mounted bar 38. Suitable mechanism is provided for oscillating the shaft 35, which mechanism preferably comprises a pinion 39 secured to one end of the shaft and in operative engagement with a second and larger pinion 40 mounted adjacent thereto. This second pinion 40 is adapted to be operated by an upwardly-extending lever arm 41 extending to a point within reach of the chauffeur, and having a tooth or dog adapted for engagement with a curved notched segment 42. For moving the lever arm 41, the pinions 40 and 39 and the shaft 35 are caused to rotate. As the shaft 35 is connected to the link 32 by the arm 37 and bar 38, and as one end of the link 32 is slidably mounted, it is evident that a rotation of the shaft causes a slight movement of the collar 34 in respect to the rod 25. With the lever arm 41 moved to one extreme position, the collar 34 is brought into alinement with the shaft 22, and the oscillations of this shaft are then no longer imparted to the rock shaft 30. With the engine and rock shaft 22 operating at uniform speeds, the throw of the rock shaft 30 may be readily controlled by the longitudinal movement of the collar 34 in respect to the rod 25. With this collar at the outer end of the rod, the throw of the link 32 is at the maximum and the vehicle is run at its greatest speed. The portion of the mechanism above described thus comprises the speed-controlling mechanism, and inasmuch as the collar 34 may be held at any desired position throughout the length of the rod 25, it is evident that the speed may be varied as gradually as desired and that no shock or jar will be produced by a change from one speed to another.

For transmitting a continuous rotary motion to the rear axle 17 from the rock shaft 30, I provide said axle with one or more clutches, preferably reversible in character and operatively connected to the rock shaft 30. Each of these clutches preferably comprises a steel drum or wheel 43 keyed or otherwise firmly secured to the axle 17 and having outwardly-extending flanges 44 upon its outer circumference. The surface of the drum between these flanges is preferably roughened or slightly corrugated, as indicated in Figs. 8, 9 and 10, whereby the drum may be more firmly held by the steel band 45 which encircles the same. One end of this band is preferably bent upon itself to form a loop 46 inclosing one end of a connecting link 47, while the opposite end of the band may be provided with a separable section 48 also having a loop 49 similar to the loop 46 and inclosing one end of a connecting link 50 similar to the link 47. These two links preferably lie adjacent the two opposite flanges 44 of the wheel, and the free end of each link is bent outwardly at substantially right angles and extends through a cross bar 51 normally lying slightly diagonally to the surface of the drum. By turning this cross bar 51 to a position more nearly parallel to the axis of the drum, the ends of the band 45 are drawn toward each other and the band caused to firmly grip the drum; while by turning the cross bar 51 to a greater angle the ends of the band are separated from each other and the band freed from its frictional engagement with the drum.

Adjacent the drum and pivotally mounted upon the axle 17, I provide an arm 52 extending outward to a point adjacent the circumference of the drum and provided with two parallel extensions 53 lying on opposite sides of the cross bar 51 and closely adjacent the circumferential surface of the drum. Each extension 53 is cut away upon its inner surface to provide guideways for a transversely movable plate 54 hereinafter referred to as "the reversing plate". This plate is provided with an opening through which the upper ends of the links 47 and 50 extend. Two opposite sides 55 and 56 of the opening lie substantially parallel to the longitudinal edges of the plate, while two other sides of the opening, 57 and 58, are parallel to each other and extend at an angle to the first mentioned sides 55 and 56. Adjacent each end of the opening I provide enlarged recesses 59 and 60. One side of each of these recesses lies in the same straight line and centrally disposed longitudinally of the plate 54. Opposite these sides 59$^a$ and 60$^a$, the wall of each recess is outwardly curved to receive the upturned portion of one of the links 47 and 50. The particular shape of the opening is clearly illustrated in Figs. 9 and 11, one of which illustrates the plate in a position to produce a forward movement of the vehicle, while the other shows the plate in a position to cause a backward movement. For holding the reversing plate 54 in place and preventing accidental displacement thereof, I provide a suitable cover 61 in engagement with the outer surface of the reversing plate and rigidly secured to the extensions 53 in any suitable manner.

The rock shaft 30 previously referred to, is provided with an outwardly-extending arm 62, and the outer end of this arm is connected to the arm 52 carried by the axle by means of a suitable pivotally mounted connecting rod 63. By the oscillation of the shaft 30, the arms 52 and 62 are caused to move simultaneously, and the movement of the arm 52 causes a rotation of the drum 43 in the manner about to be described.

With the reversing plate 54 in the position indicated in Fig. 9 and with the arm 52 and the parts carried thereby moving in the direction indicated by the arrow in Fig. 6, one of the extensions 53 will engage with one end of the transverse bar 51, as indicated in Fig. 10, and tend to move this bar to a position parallel with the extensions 53. This movement tends to bring the ends of the band closer together, and the wheel is firmly gripped by the band and caused to rotate therewith. At the end of the stroke when the shaft 30 rotates in the opposite direction, the arm 52 is moved in the reverse direction and the pressure upon the end of the transverse bar 51 relieved and the bar may again assume its inclined position. The upturned end of the link 47 then engages with the side 59ᵃ of the recess and the opposite end of the inclined bar 51 is prevented from engaging with the opposite extensions 53. As the ends of the links 47 and 50 are but a short distance apart very little leverage is obtained and the stroke is accomplished without any gripping action on the wheel, and therefore the latter is permitted to remain stationary or to continue rotating in the same direction as that produced on the previous stroke. Thus it will be seen that upon each stroke of the connecting bar the arm 52 is oscillated in one direction and the wheel is caused to rotate therewith, but upon the remaining alternate strokes of the bar the arm is returned to its original position, and the wheel is freed from engagement with the band and does not reverse its direction.

For reversing the direction of rotation of the wheel 43, all that is necessary is to move the reversing plate 54 to the position indicated in Fig. 11. While in this position a movement of the arm and extensions 53 in the direction indicated by the arrow, will cause the engagement of one of these extensions with the opposite end of the transverse bar 51 and the band will be tightened and the wheel gripped to rotate upon the opposite strokes to those in which the wheel was gripped while with the reversing plate in the position indicated in Fig. 9. Thus by a slight movement of the plate 54, the direction of rotation of the wheel 43 may be reversed at will without stopping or interfering in any way with the speed or action of the engine.

For producing a continuous rotation of the driving axle 17, I preferably provide the rock shaft 30 with two arms 62 extending in opposite directions therefrom, and provide two drums and clutch mechanisms on the axle 17, whereby as the shaft 30 rotates in one direction one of the drums is gripped to rotate the drive shaft; while when the shaft 30 is rotated in the opposite direction, the other drum is gripped and thus power is continuously transmitted to the drive shaft. To prevent jarring action and to give the parts greater freedom, I preferably construct the arms 62 of spring steel, having one end thereof inserted within the shaft, as indicated in Figs. 4 and 6. In this manner a slight resiliency is secured and a more efficient and rapid reversal of direction on the part of the arm 52 permitted. Any suitable means may be provided for moving the reversing plates 54 of the two drums so as to reverse the direction of rotation of the drive shaft. One means for accomplishing this result is illustrated in Figs. 1 and 2, in which I provide a vertical rotatable shaft 64 having an operating handle 65 at the upper end thereof.

On the opposite side of the vehicle is a shaft 66 similar to the shaft 64, and each shaft is provided with a rearwardly-extending arm 67. The two arms are connected for simultaneous movement by a link 68 and the end of each link is provided with a second link 69 pivotally secured thereto and having the end thereof provided with a slot to receive a suitable pin or stud 70 on the reversing plate. The slot in the end of the link provides for the movement of the reversing plate along the circumference of its corresponding drum, but by moving the handle 65 the links 69 are drawn longitudinally and the desired movement of the reversing plates secured.

My invention is especially applicable for use in connection with divided axles of motor vehicles, and in this construction the two separate drums are secured to the separate portions of the axle, so that in making turns with the machine no compensating gear is required, and at other times the power is delivered equally to both portions of the shaft and to both driving wheels.

The device is also especially adapted for use as a brake. In employing the clutch in this capacity with the car moving in a forward direction, the lever 41 is thrown toward the forward end of the car and into the last notch. By so doing, the motor is disconnected from the clutch that moves the drums, and if the reversing plate is then moved in the opposite direction to that by which the forward movement of the car is obtained, the clutch band is made to grip the clutch wheel and to hold the same as a brake. The same result would, of course, be obtained if the motor were connected with the clutch wheel. In operating the reversing plate, it will be noted that as it passes the mid point over the clutch band, the latter is tightened more and more as the reversing plate is moved farther in that direction, thus enabling the operator to obtain either a less or greater degree of brake force as he may require.

Having thus described my invention, I claim as new and desire to secure by Letters Patent:

1. In combination, a rotatable drum, a band encircling the same and members carried thereby and having outwardly extending end portions, a cross bar in engagement with said ends and normally extending diagonally to the face of the drum, a longitudinally movable member, and means carried thereby adapted to engage with one end of said cross bar to tighten the band when said member is moved in one direction and adapted to engage with one of said outwardly extending end portions without tightening the band when said member is moved in the opposite direction.

2. In combination, a rotatable drum, a band encircling the same and provided with end members having outwardly extending portions, a cross bar adapted to engage with said end portions, a longitudinally movable member, means carried thereby and adapted to engage with one end of the cross bar when said member is moved in one direction, and a movable reversing plate for controlling the position of the cross bar in respect to the means engaging therewith.

3. In combination, a rotatable drum, a band encircling the same and provided with end members having outwardly-extending portions, a cross bar in engagement with said end portions and normally extending diagonally of the periphery of the drum, a longitudinally-movable operating member, transversely-disposed members carried thereby and disposed upon opposite sides of said cross bar, and means movable transversely of said drum for controlling the engagement of said bar with said transverse members.

4. In combination, a rotatable drum, a band encircling the same and provided with end members having outwardly-extending portions, a cross bar in engagement with said end portions and normally extending diagonally of the periphery of the drum, a longitudinally-movable operating member, transversely-disposed members carried thereby and disposed upon opposite sides of said cross bar, and means movable transversely of said drum and having an opening therein for the reception of said outwardly-extending portions and adapted to engage therewith to control the engagement of said transversely-extending members with the ends of said cross bar.

In testimony whereof I have signed my name to this specification in the presence of two subscribing witnesses.

ERI FERRIS JEWETT.

Witnesses:
  G. F. SHAW,
  GEO. H. EMSLIE.